United States Patent [19]

Shoji et al.

[11] Patent Number: 5,434,724
[45] Date of Patent: Jul. 18, 1995

[54] METHOD AND APPARATUS FOR THE HIGH SPEED DRIVING OF A STEPPER MOTOR AGAINST SEEK ERROR UPON POWER RESTORATION IN A MICROCOMPUTER SYSTEM

[75] Inventors: Makoto Shoji, Akigawa; Tohru Miura, Chofu; Hiroshi Tsuyuguchi, Tokyo, all of Japan

[73] Assignee: TEAC Corporation, Tokyo, Japan

[21] Appl. No.: 201,774

[22] Filed: Feb. 25, 1994

[30] Foreign Application Priority Data

Feb. 26, 1993 [JP] Japan .................. 5-063366

[51] Int. Cl.⁶ ............................................ G11B 19/02
[52] U.S. Cl. .................... 360/75; 360/78.13; 318/696
[58] Field of Search ............ 360/69, 75, 78.08, 78.13, 360/137; 318/685, 696

[56] References Cited

U.S. PATENT DOCUMENTS 4,594,620 6/1986 Shoji et al. .
4,658,307 4/1987 Tsuyuguchi et al. .
4,782,406 11/1988 Shoji et al. .................. 360/75 X

FOREIGN PATENT DOCUMENTS 163947 12/1985 European Pat. Off. ......... 360/78.13
60-177466 9/1985 Japan .

*Primary Examiner*—Aristotelis Psitos
*Assistant Examiner*—James L. Habermehl

*Attorney, Agent, or Firm*—Woodcock Washburn Kurtz Mackiewicz & Norris

[57] ABSTRACT

A microcomputer system having a flexible magnetic disk drive and a controller therefor, with the disk drive including a stepper motor for incrementally moving a transducer from track to track on a rotating magnetic disk, and a clock which is inherently unstable in operation during a predefinable startup period thereof after being powered on. In order to enable the disk drive to internally generate stepping pulses for driving the stepper motor at twice as high a rate as by external stepping pulses from the controller without being affected by unstable clock pulses during the startup period of the clock, the controller supplies external stepping pulses to the disk drive after imparting a predetermined delay, longer than the startup period of the clock, to each series of external stepping pulses with respect to the moment a power save signal, also supplied from the controller to the disk drive, indicates that the clock and other power consuming parts of the disk drive be powered. Within the disk drive a counter counts the clock pulses for a length of time equal to half the period of each series of external stepping pulses in response to each incoming external stepping pulse, thereby providing output pulses that rise with the respective external stepping pulses. A pulse generator circuit generates internal stepping pulses in synchronism with both leading and trailing edges of the counter output pulses. Additional embodiments are disclosed.

14 Claims, 12 Drawing Sheets

METHOD AND APPARATUS FOR THE HIGH SPEED DRIVING OF A STEPPER MOTOR AGAINST SEEK ERROR UPON POWER RESTORATION IN A MICROCOMPUTER SYSTEM

BACKGROUND OF THE INVENTION

This invention relates generally to computer systems, particularly to microcomputer systems such as personal computers and word processors, and more particularly to such microcomputer systems of the kind including a data storage device or devices employing rotating disks such as flexible magnetic disks as storage media, and a stepper motor for incrementally driving a transducer or magnetic head unit from track to track on the disk. Still more particularly, the invention deals, in such microcomputer systems, with a method of, and means for, driving the stepper motor at high speed against the risk of seek errors that would conventionally have been liable to occur if a clock, customarily incorporated in disk drives, were powered on and off during the operation of the microcomputer system in order to save power.

The stepper motor ranks with the voice coil motor as actuator most commonly used in disk drives for moving the head unit to any desired track on the disk. Shoji et al. U.S. Pat. No. 4,594,620, assigned to the assignee of the instant application, is herein cited as teaching a head drive system with a four phase, single phase drive stepper motor.

In disk drives operating under the control of a host system, the stepper motor is controlled by stepping pulses and a stepping direction signal supplied from the host. Each external stepping pulse from the host may correspond to either one or, for higher track seek speed, two or more increments of the stepper motor. Conventionally, for driving the stepper motor at twice the recurrence rate of the external stepping pulses, for example, the disk drive has been provided with a clock and a counter for internally producing stepping pulses at the same rate as the external ones but with a phase difference of half the pulse period. The external and internal stepping pulses have been interleaved to provide a series of pulses with a repetition rate twice that of the external pulses and thereby to drive the stepper motor.

This conventional practice has proved disadvantageous when the clock used for generating the internal pulses is unpowered for saving power when the disk drive is standing by, that is, when no data transfer operation is in progress in the disk drive.

Among various power saving schemes heretofore suggested and used with disk drives is the one described and claimed in Tsuyuguchi et al. U.S. Pat. No. 4,658,307 assigned to the assignee of this application. Tsuyuguchi et al. teaches to connect the disk motor driver circuit, the stepper motor driver circuit, and the read/write circuit, all standard components of the disk drive, to a power supply via a power saving switch. This switch is closed only when a disk is loaded in the disk drive or is when the "drive select" and "motor on" signals from the host are in prescribed states. The motor driver circuits and read/write circuit are therefore not powered in the absence of a disk or when the "drive select" and "motor on" signals are in other than the prescribed states, even if the complete data processing system, comprising the host and one or more disk drives, is powered on. A very substantial saving of power can thus be accomplished.

It has also been suggested to reduce the waste of power by various other power consuming components in the disk drive. Such additional power consuming components include a supply voltage detector circuit for detecting whether the supply voltage has built up to a predetermined value when the system is switched on, a file protect sensor for sensing whether the loaded disk cartridge is protected against erasure or writing, a disk capacity sensor for discriminating between one-megabyte and two-megabyte disk cartridges which may be loaded interchangeably in the disk dive, and another disk capacity sensor for discriminating between four-megabyte and other capacity disks cartridges.

The present applicant has explored the possibilities of further reducing the power consumption of disk drives and manufactured an experimental disk drive in which the clock was unpowered when the disk drive was standing by. The trouble occurred because the clock as we have it today inherently remains unstable for some time after being powered on, failing to produce pulses at a constant repetition rate. Such irregular clock pulses during the startup period of the clock, conventionally used for production of internal stepping pulses, made it impossible in some cases to position the transducer on the desired track on the disk. It might be contemplated to circumvent this problem by making longer the spacings between the stepping pulses, but then the seek speed would drop correspondingly.

SUMMARY OF THE INVENTION

The present invention seeks, in microcomputer systems of the kind defined, to defeat the noted inconveniences heretofore encountered during the startup period of the clock in producing stable stepping pulses internally of the rotating disk data storage apparatus for track seek operation at a higher speed than is possible with external stepping pulses.

Briefly, the invention concerns a system comprising a rotating disk data transfer apparatus and a controller therefor. The data transfer apparatus includes a stepper motor for incrementally moving a transducer from track to track on a rotating data storage disk, and a clock which is inherently unstable in operation during a predefinable startup period thereof after being powered on.

Stated more specifically in one aspect thereof, the invention deals, in such a system, a method of generating stepping pulses internally of the data transfer apparatus in response to external stepping pulses from the controller for driving the stepper motor. According to the method, a power save signal is supplied from the controller to the data transfer apparatus, the power save signal having a first prescribed state indicative of the fact that the apparatus is in condition for saving power, and a second prescribed state indicative of the fact that the apparatus is not in condition for saving power. External stepping pulses are also supplied, either singly or in a series of two or more, from the controller to the data transfer apparatus after imparting a predetermined delay, longer than the startup period of the clock, to at least all but the first of each series of external stepping pulses with respect to a moment of change of the power save signal from the first to the second prescribed state. The predetermined delay is applied to each single external stepping pulse only in the case where all of each series of external stepping pulses are delayed. Each series of external stepping pulses has a constant period except for the predetermined delay. In the data transfer apparatus, the clock pulses are counted for a preassigned length of time, typically half the period of each series of external stepping pulses, in response to each incoming external stepping pulse in order to provide counter output pulses that rise with the respective external stepping pulses. Internal stepping pulses are then generated in synchronism with at least trailing edges of the counter output pulses.

When generated in synchronism with both leading and trailing edges of the counter output pulses, the internal stepping pulses are twice as high in recurrence rate as the external stepping pulses. When generated in synchronism with only the trailing edges of the counter output pulses, on the other hand, then the internal stepping pulses may be interleaved with the external stepping pulses. Either way, the internal stepping pulses are produced according to the invention without being affected by the unstable clock pulses during the startup period of the clock, so that the clock can be held unpowered when the power save signal is in the first prescribed state without the noted inconveniences encountered heretofore.

According to another aspect of the invention, there is provided a controller for a rotating disk data storage apparatus suitable for use in carrying out the method of this invention summarized above. Basically, the controller comprises first generator means for supplying the power save signal to the data transfer apparatus, and second generator means for supplying to the data transfer apparatus the external stepping pulses after imparting the predetermined delay, to at least all but the first of each series of external stepping pulses with respect to a moment of change of the power save signal from the first to the second prescribed state.

It is of course possible to fabricate such a controller in chip form. Alternatively, however, disk drive controllers in chip form commercially available today may be used in combination with means for imparting the predetermined delay to each external stepping pulse generated, or to all but the first of each series of such pulses generated. This alternative offers the advantage of a substantial saving in the cost of manufacture.

The above and other features and advantages of this invention and the manner of realizing them will become more apparent, and the invention itself will best be understood, from a study of the following description and appended claims, with reference had to the attached drawings showing some preferred embodiments of the invention.

DESCRIPTION OF THE PREFERRED EMBODIMENTS

The present invention will now be described in detail as embodied in the microcomputer system of FIG. 1 suitable for use as a personal computer, word processor or the like. The illustrated microcomputer system comprises a host computer including a central processor unit (CPU) 10, a flexible magnetic disk drive or floppy disk drive (FDD) 12 operating under the control of the CPU, and an FDD controller 14 connected between the CPU and the FDD. The CPU 10 has additionally connected thereto random access and read only memories, input and output devices, a display, which are all not shown because of their conventional nature and their impertinence to the invention.

Figure 2:
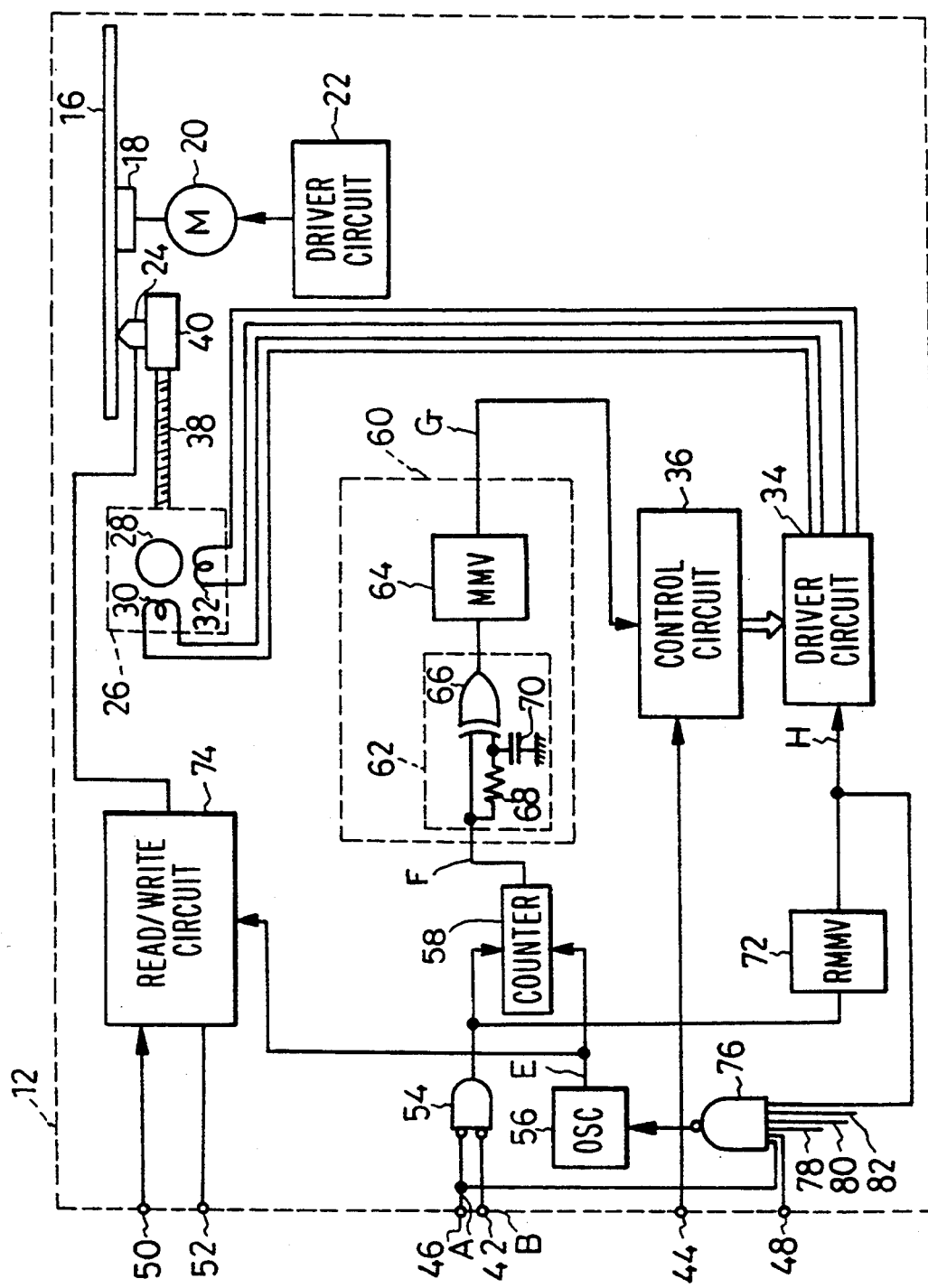
FIG. 2 is a combined pictorial and block diagrammatic illustration of a flexible magnetic disk drive included in the microcomputer system of FIG. 1.

As illustrated in detail in FIG. 2, the FDD 12 is intended for use with floppy disks of three and a half inch diameter, one of the standard disk sizes. The FDD 12 is herein shown loaded with one such disk 16. It is understood that this disk is single sided, having a multiplicity of annular, concentric data tracks on but one of its opposite major surfaces, The FDD 12 has a turntable 18 on which the metal made hub, not seen, of the disk 16 is placed. The turntable 18 is driven directly by an electric disk drive motor 20 which is controllably energized by a motor driver circuit 22.

For data transfer with the disk 16 a transducer or read/write head unit 24 is moved across the tracks on the disk by a positioning mechanism comprising a bidirectional motor 26 of the electrically stepping type commonly known as the stepper motor. The stepper motor 26 is shown as a bipolar, four phase motor comprising a rotor 28 and two sets of stator windings 30 and 32.

Electrically connected to the stepper motor 26 is a driver circuit 34 which, under the control of a stepper motor phase control circuit 36, sequentially excites the four phase windings of the stepper motor to cause bidirectional rotation thereof by discrete increments or steps. The bidirectional rotation of the stepper motor 26 is translated by a lead screw 38 into the linear back and forth travel of a carriage 40. The transducer 24 is mounted to the carriage 40 for joint travel therewith as from track to track on the disk 16.

The FDD 12 has the following terminals for connection to the controller 14: a stepping pulse input 42, DIRECTION signal input 44, DRIVE SELECT signal input 46, POWER SAVE signal input 48, data input 50 and data output 52. Actually, however, there are many other standard terminals which are not shown because of their irrelevance.

The stepping pulse input 42 receives stepping pulses used for causing the incremental rotation of the stepper motor 26. The stepping pulses from the FDD controller 14 are not directly fed into the stepper motor control circuit 36; instead, in response to these stepping pulses, similar stepping pulses are generated internally of the FDD 12 at a recurrence rate twice that of the incoming stepping pulses, prior to application to the stepper motor control circuit. The stepping pulses supplied from the FDD controller 14 are herein termed external stepping pulses by way of contradistinction from internal stepping pulses generated internally of the FDD 12. The DIRECTION signal input 44 is connected directly to the control circuit 36 for delivering thereto a DIRECTION signal indicative of the rotational direction of the stepper motor 26.

The DRIVE SELECT signal received at the terminal 46 indicates whether this particular FDD 12 is chosen for data transfer with the disk 16 or not. The POWER SAVE signal received at the terminal 48 denotes whether all or some of the power consuming components of the FDD 12 may, or may not, be held unenergized for saving power. Both DRIVE SELECT and POWER SAVE signals will be later described in more detail.

For generating internal stepping pulses in response to the external ones, the FDD 12 comprises a NOR gate 54, a clock 56, a counter 58 and an internal stepping pulse generator circuit 60. The NOR gate 54 has one input connected to the stepping pulse input 42, and another to the DRIVE SELECT signal input 46. The counter 58 has a first input connected to the clock 56, and another to the NOR gate 54, for counting the clock pulses during a prescribed length of time when set by each external stepping pulse.

The internal stepping pulse generator circuit 60 is shown as a serial connection of a pulse edge detector circuit 62 and a monostable multivibrator (MMV) 64. The edge detector circuit 62 includes an exclusive OR gate 66 having one input coupled directly to the counter 58, and another input also coupled thereto via a delay circuit comprising resistor 68 and capacitor 70. Thus the edge detector circuit 62 puts out trigger pulses in synchronism with both leading and trailing edges of the output pulses of the counter 58. Triggered by these output pulses from the edge detector circuit 58, the MMV 64 produces the desired internal stepping pulses according to the invention, for delivery to the stepper motor control circuit 36.

A retriggerable monostable multivibrator (RMMV) 72 is connected between the output of the NOR gate 54 and a power supply control input of the stepper motor driver circuit 34. The RMMV 72 goes low in response to the first of each incoming series of external stepping pulses, and high upon lapse of a preassigned length of time following the last of the series of external stepping pulses. The stepper motor driver circuit 34 is to be powered and so enabled to drive the stepper motor 26 only during the low state of the RMMV 72.

At 74 is seen a read/write circuit connected to the data input 50, data output 52 and transducer 24. The read/write circuit 74 is a standard circuit processing data to be written on, and recovered from, the disk 16. It is understood that the read/write circuit 74 includes a counter, not shown, to which the clock 56 is connected and which counts the clock pulses for timing the writing of data on the disk 16.

FIG. 2 also shows a NAND gate 76 having an output connected to a power control input of the clock 56, and inputs connected to all of the DRIVE SELECT signal input 46, POWER SAVE signal input 48, RMMV 72, MOTOR ON signal line 78, WRITE GATE and ERASE GATE signal line 80, and DISK PRESENCE signal line 82. All the capitalized signals are familiar to those skilled in the disk drive art. The clock 56 is therefore powered and so enabled to produce pulses when at least one of the DRIVE SELECT signal, POWER SAVE signal, MOTOR ON signal, WRITE GATE and ERASE GATE signal, DISK PRESENCE signal, and RMMV 72 is low. When all these inputs are high, on the other hand, is the clock 56 held unenergized for saving power.

With reference back to FIG. 1 the FDD controller 14 is shown to comprise read/write data processor means 84, DRIVE SELECT signal generator means 86, stepping pulse generator means 88, DIRECTION signal generator means 90, POWER SAVE signal generator means 92, SEEK END FLAG generator means 94, and sequence control circuit 96. It is to be understood that this showing of FIG. 1 is functional; in practice, the hardware of the FDD controller 14 may be such that the listed means 84-94 may not be clearly distinguishable one from another.

All the noted means 84-94 of the FDD controller 14 are connected to the CPU 10 of the host system by way of a bus system 98 and to the sequence control circuit 96. Additionally, the read/write data processor means 84 is connected to the data input 50 and data output 52 of the FDD 12, the DRIVE SELECT signal generator means 86 to the FDD input 46, the stepping pulse generator means 88 to the FDD input 42 and to the SEEK END FLAG generator means 94, the DIRECTION signal generator means 90 to the FDD input 44, and the POWER SAVE signal generator means 92 to the FDD input 48. The sequence control circuit 96 functions to time the operations of the means 84-94.

Operation

Figure 1:
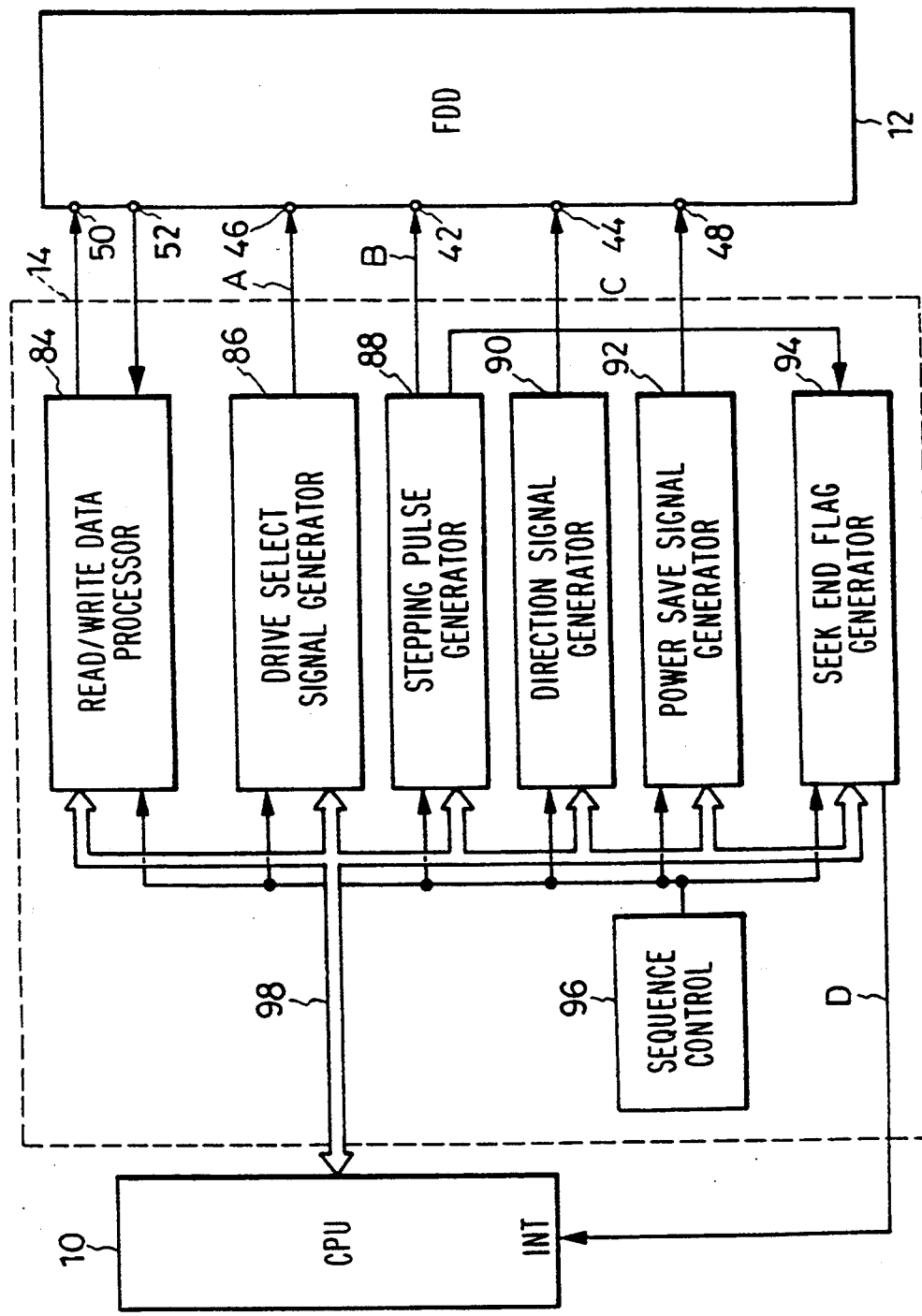
FIG. 1 is a block diagram of a microcomputer system embodying the principles of this invention.
Figure 3:
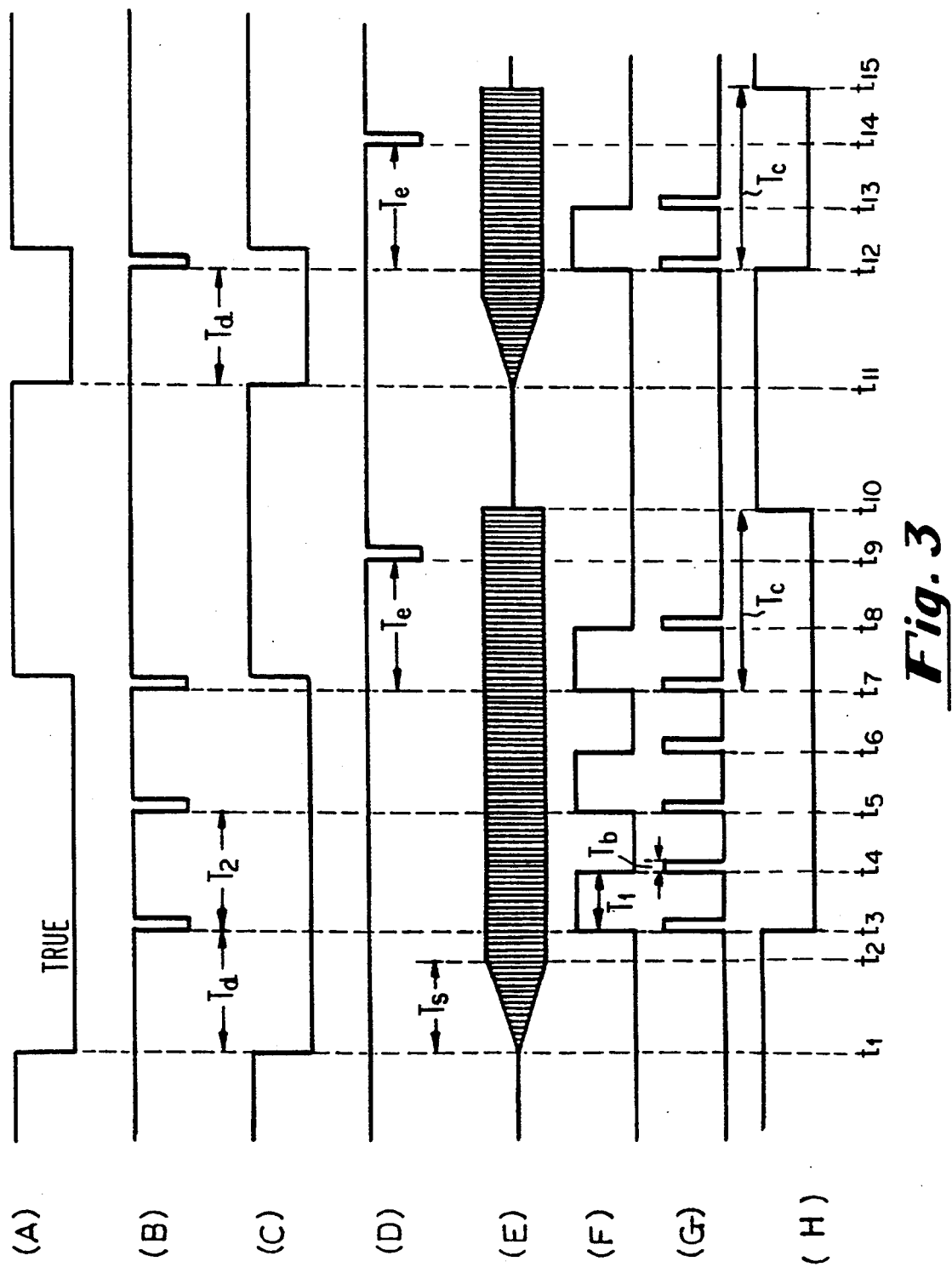
FIG. 3 is a diagram showing waveforms appearing in various parts of the FIGS. 1 and 2 microcomputer system in order to explain its operation.

The following operational description of the FIGS. 1 and 2 microcomputer system will be better understood by referring to FIG. 3 which shows at (A) through (H) the waveforms appearing in the various parts of the system. In FIGS. 1 and 2, therefore, the parts where the waveforms (A) through (H) of FIG. 3 appear are indicated by like capitals.

Shown at (A) in FIG. 3 is the DRIVE SELECT signal supplied from its generator means 86 in the FDD controller 14, FIG. 1, to the input 46 of the FDD 12. Basically, the DRIVE SELECT signal is true (low in this case) when this particular FDD 12 is chosen for data transfer with the disk 16. More specifically, however, and according to common practice in the art, the DRIVE SELECT signal is true during: (a) track seeking; (b) reading or writing of data on the disk 16; (c) recalibration of the transducer 24 on the disk; and (d) production of FDD sensing devices status commands.

The POWER SAVE signal, shown at (C) in FIG. 3 is high, indicating that the FDD 12 is in condition for saving power, when the DRIVE SELECT signal is false and, at the same time, when the FDD 12 is not in track seek operation. Thus the POWER SAVE signal is identical with the DRIVE SELECT signal in this embodiment. As far as the invention is concerned, therefore, the DRIVE SELECT signal may be thought of as being synonymous with the POWER SAVE signal. The POWER SAVE signal generator means 92 produces the POWER SAVE signal from power save commands supplied from the CPU 10. Alternatively, however, such a signal might be generated internally of the FDD 12.

The NOR gate 54, FIG. 2, of the FDD 12 inputs both the FIG. 3(A) DRIVE SELECT signal and the "negative" external stepping pulses, shown at (B) in FIG. 3, supplied from the stepping pulse generator means 88, FIG. 1, of the FDD controller 14. Consequently, when the DRIVE SELECT signal is true, the NOR gate 54 permits the passage of the external stepping pulses therethrough, making them "positive" in so doing.

Set by each such external stepping pulse, the counter 58 starts counting the clock pulses, FIG. 3(E), from the clock 56 for a length of time $T_1$ which is equal to half the period $T_2$ of the FIG. 3(B) external stepping pulses. Thus, as indicated at (F) in FIG. 3, the counter 58 produces pulses that rise with the respective external stepping pulses and which decay upon lapse of the time $T_1$.

In this microcomputer system, however, the clock 56 is not constantly powered when the system is in operation, but only when one of the noted six input conditions of the NAND gate 76 is met. The clock pulses of FIG. 3(E) are drawn on the assumption that the clock 56 has been powered on at times $t_1$ and $t_{11}$ when the FIG. 3(A) DRIVE SELECT signal and FIG. 3(C) POWER SAVE signal both go low. As has been pointed out in the course of the description of the prior art, the clock 56 is inherently incapable of producing stable pulses immediately after being powered on, but starts to do so only upon lapse of a startup period Ts, lasting from $t_1$ to $t_2$, thereafter. Counting the unstable clock pulses during the startup period Ts, the counter 58 would fail to produce the pulses of the desired duration $T_1$.

In order to overcome this inconvenience, and according to a feature of this invention, the stepping pulse generator means 88 of the FDD controller 14 is caused to generate the first stepping pulse upon lapse of a preassigned delay period Td following the time $t_1$ when the clock 56 is powered on, as indicated at (B) in FIG. 3. The delay period Td should be not less, preferably longer, than the unstable startup period Ts of the clock 56.

Admittedly, in prior art FDD controllers, too, stepping pulses were generated shortly after the DRIVE SELECT signal had become true. However, the clock in conventional FDDs was held powered throughout the run of the microcomputer system, so that the delay in the production of stepping pulses was determined without regard to the unstable startup period of the clock; indeed, the delay was of the order of microseconds or less. Contrastingly, according to the invention, the delay period Td is of the order of milliseconds, preferably from 0.5 to 10.0 milliseconds, it being essential that the delay period be longer than the startup period Ts of the clock 56.

Thus, as will be understood from (B), (E) and (F) in FIG. 3, the counter 58 starts counting the clock pulses at time $t_5$, after the clock pulses have stabilized at time $t_2$, and so will produce pulses of the desired duration $T_1$, half the period $T_2$, of the external stepping pulses, as from $t_3$ to $t_4$, from $t_5$ to $t_6$, etc.

Inputting these FIG. 3(F) output pulses of the counter 58, the edge detector circuit 62 of the internal stepping pulse generator circuit 60 puts out trigger pulses in synchronism with both leading and trailing edges of the incoming counter output pulses. The trigger pulses cause the MMV 64 to produce the desired internal stepping pulses shown at (G) in FIG. 3. The internal stepping pulses have a duration Tb which is much shorter than the duration $T_1$ of the FIG. 3(F) output pulses of the counter 58 and which is approximately equal to the duration of each external stepping pulse. A comparison of (B) and (G) in FIG. 3 will show that the internal stepping pulses are twice as high in recurrence rate as the external ones.

The stepper motor control circuit 36 inputs both the internal stepping pulses and the DIRECTION signal from the FDD input 44 and conventionally functions to supply appropriate motor control signals to the driver circuit 34. The stepper motor 26 will rotate a number of increments determined by each series of internal stepping pulses, and in a direction determined by the DIRECTION signal, to cause the transducer 24 to travel to a desired track on the disk 16.

The seek end flag generator means 94, FIG. 1, of the FDD controller 12 will generate a seek end flag at times $t_9$ and $t_{14}$, as at (D) in FIG. 3, upon lapse of a period Te following the last of each series of external stepping pulses. The period Te is approximately equal to the external stepping pulse period $T_2$ and longer than the time required for the transducer 24 to move a required distance to the destination track in response to the two internal stepping pulses generated in response to the last of each series of external stepping pulses. Thus, upon completion of track seeking, the seek end flag is sent to the interrupt input INT of the CPU 10 in order to inform the latter of that fact.

Connected between the output of the NOR gate 54 and the power supply control input of the stepper motor driver circuit 34, the RMMV 72 goes low and remains so for a predetermined period Tc, as at (H) in FIG. 3, in response to each incoming external stepping pulse. The period Tc is longer than the period $T_2$ of the external stepping pulses. Consequently, in response to each incoming series of consecutive external stepping pulses, the RMMV 72 goes low, as at times $t_3$ and $t_{12}$, with the first of that series of external stepping pulses and remains so until the lapse of the period Tc, as at times $t_{10}$ and $t_{15}$, following the last of the series of external stepping pulses. Only during the low state of the RMMV 72 is the stepper motor driver circuit 34 powered and so enabled to drive the stepper motor 26 under the control of the control circuit 36. The driver circuit 34 is held unpowered, or powered with a lower voltage, when the RMMV is high.

Thus the invention succeeds in producing the internal stepping pulses having twice the recurrence rate of the external ones and exactly synchronized therewith. The stepper motor can be thereby driven twice as fast as by the external stepping pulses. It will be appreciated that the internal stepping pulses are totally independent of the unstable operation of the clock 56 during its startup period. Unlike the prior art, therefore, the clock may be powered and unpowered as dictated by the POWER SAVE or DRIVE SELECT signal, among other input conditions of the NAND gate 76, in order to avoid waste of energy.

Figure 4:
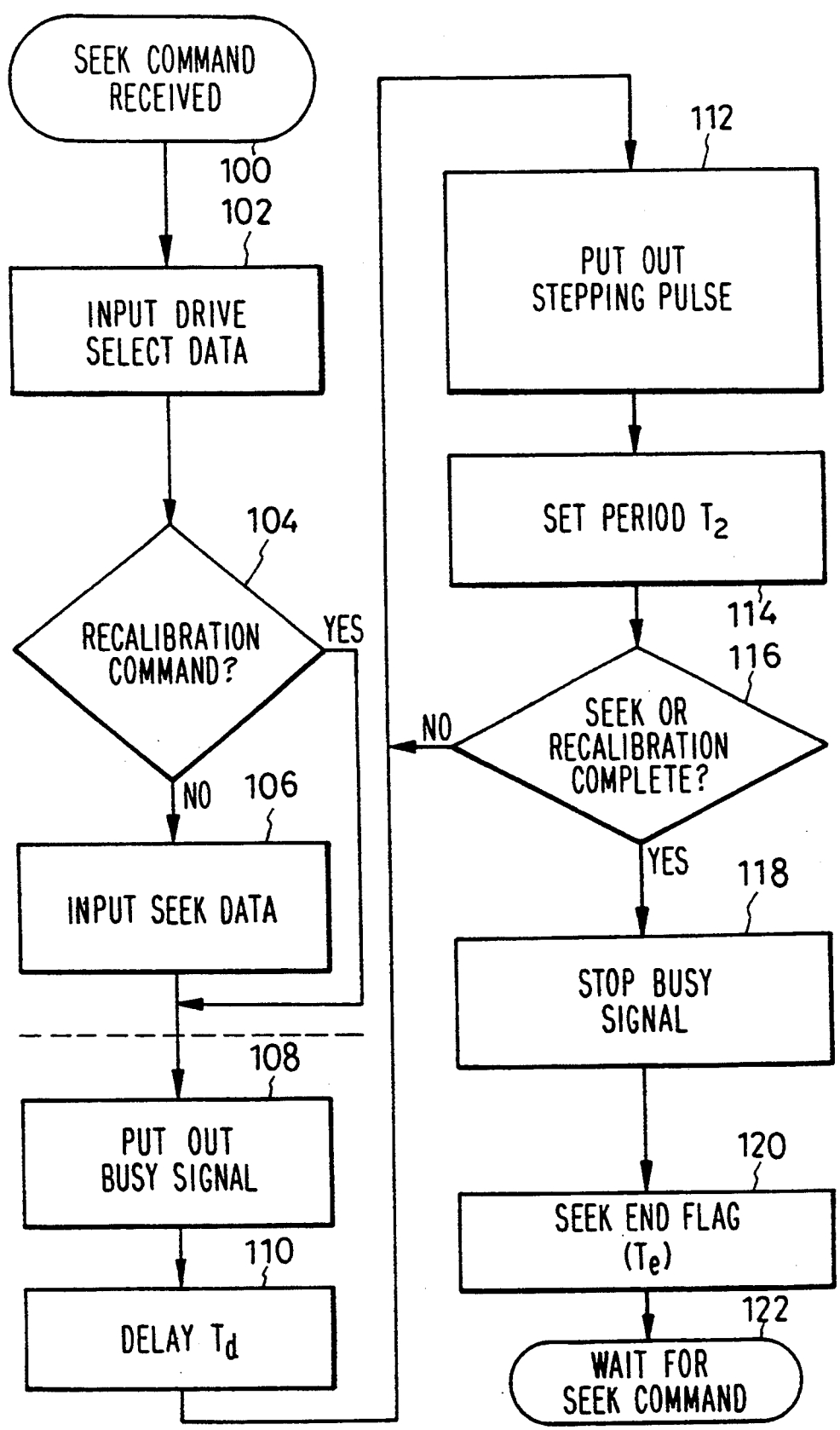
FIG. 4 is a flowchart explanatory of the track seek operation of the FIGS. 1 and 2 microcomputer system.

FIG. 4 is a flowchart explanatory of the track seeking or recalibrating routine of the FDD controller 22 according to the invention. The routine starts at 100 where the controller 14 inputs a track seek command from the CPU 10. The seek command will be followed by DRIVE SELECT data, as indicated at the block 102. Next comes the logical node 104 which asks whether the input command is that of recalibration or not. The controller 14 will then input seek data from the CPU 10 at the block 106 if the answer to the node 104 is no. No further data will come from the CPU 10 during the rest of the routine.

At the next block 108 the controller generates a BUSY signal, indicating that the FDD 12 is active, whereupon the DRIVE SELECT signal goes low (true), and the POWER SAVE signal also goes low, indicating that the FDD is not in condition for saving power. The next block 110 indicates the introduction of the delay period Td according to the invention before the production of a stepping pulse at the following block 112. Upon lapse of the predetermined stepping pulse period $T_2$ at the block 114, it is questioned at the node 116 whether the track seek or recalibration is complete. If the answer is no, then the routine returns to the block 47 for the production of another stepping pulse.

The cycle of the blocks 112 and 114 and node 116 is repeated until the track seek or recalibration is completed. Thereupon the BUSY signal is canceled at the block 118, with the result that both DRIVE SELECT and POWER SAVE signal go high. A seek end flag is then generated at the block 120 upon lapse of the period Te after the last stepping pulse. Then the controller waits for the next seek command at 122.

Second Form

Figure 5:
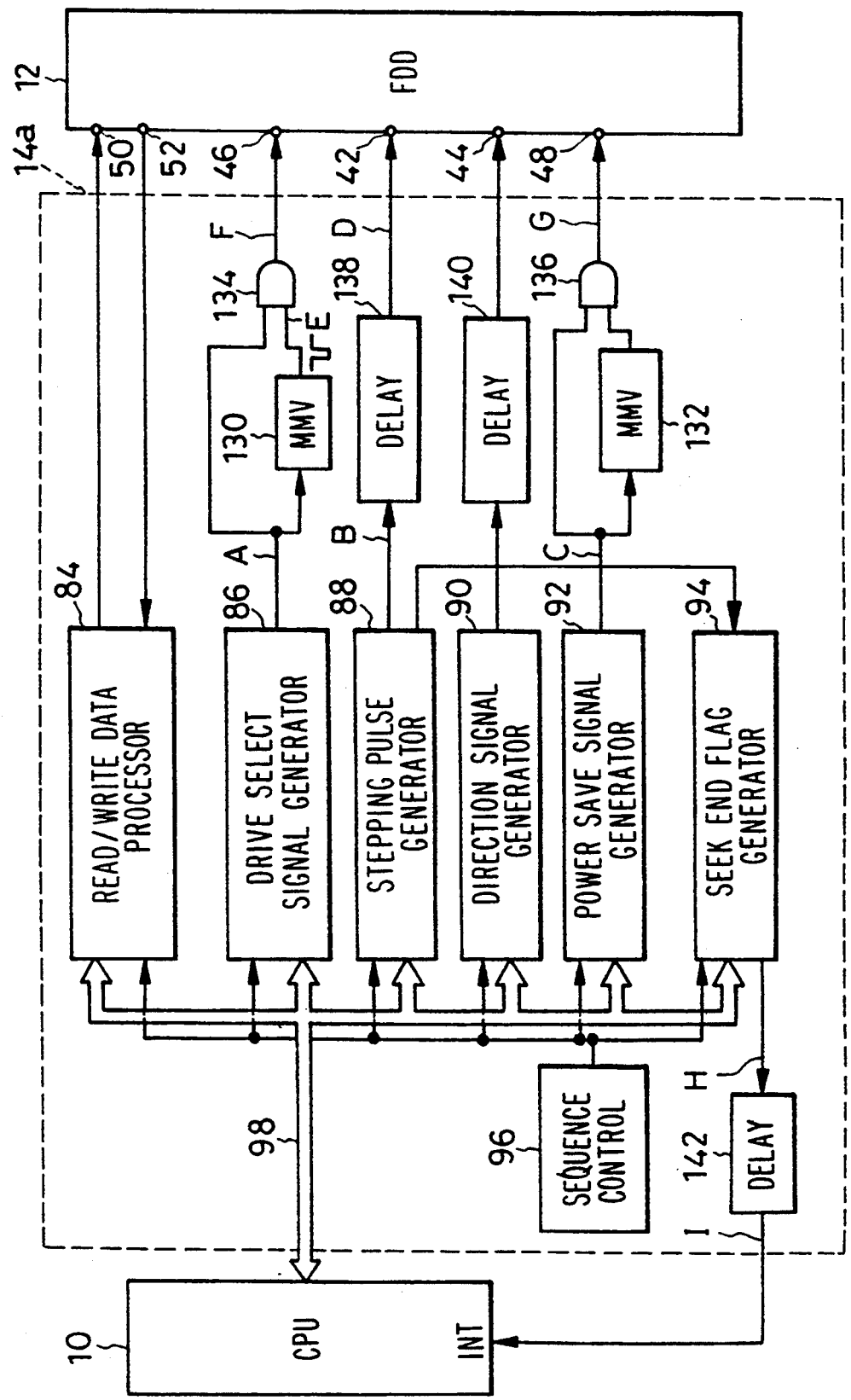
FIG. 5 is a diagram similar to FIG. 1 but showing an alternate disk drive controller according to the invention.

FIG. 5 shows a modified FDD controller 14a to be substituted for the controller 14 of the FIGS. 1 and 2 microcomputer system. The modified controller 14a differs from the FIG. 1 controller 14 in additionally comprising two MMVs 130 and 132, two AND gates 134 and 136, and three delay circuits 138, 140 and 142. The other components of the modified controller 14a can be of substantially the same constructions as their counterparts in the FIG. 1 controller 14, so that like reference numerals are used to denote such like parts.

The DRIVE SELECT signal generator means 86 of the modified controller 14a has its output connected directly to one input of the AND gate 134, and to another input thereof via the MMV 130. The output of the AND gate 134 is connected to the input 46 of the FDD 12.

The output of the stepping pulse generator means 88 is connected to the FDD input 42 via the delay circuit 138. The output of the DIRECTION signal generator means 90 is connected to the FDD input 44 via the delay circuit 140.

The output of the POWER SAVE signal generator means 92 is connected to one input of the AND gate 136, and to another input thereof via the MMV 132. The output of the AND gate 136 is connected to the FDD input 48. The delay circuit 142 is connected between the seek end flag generator means 94 and the CPU 10.

Operation of Second Form

Figure 6:
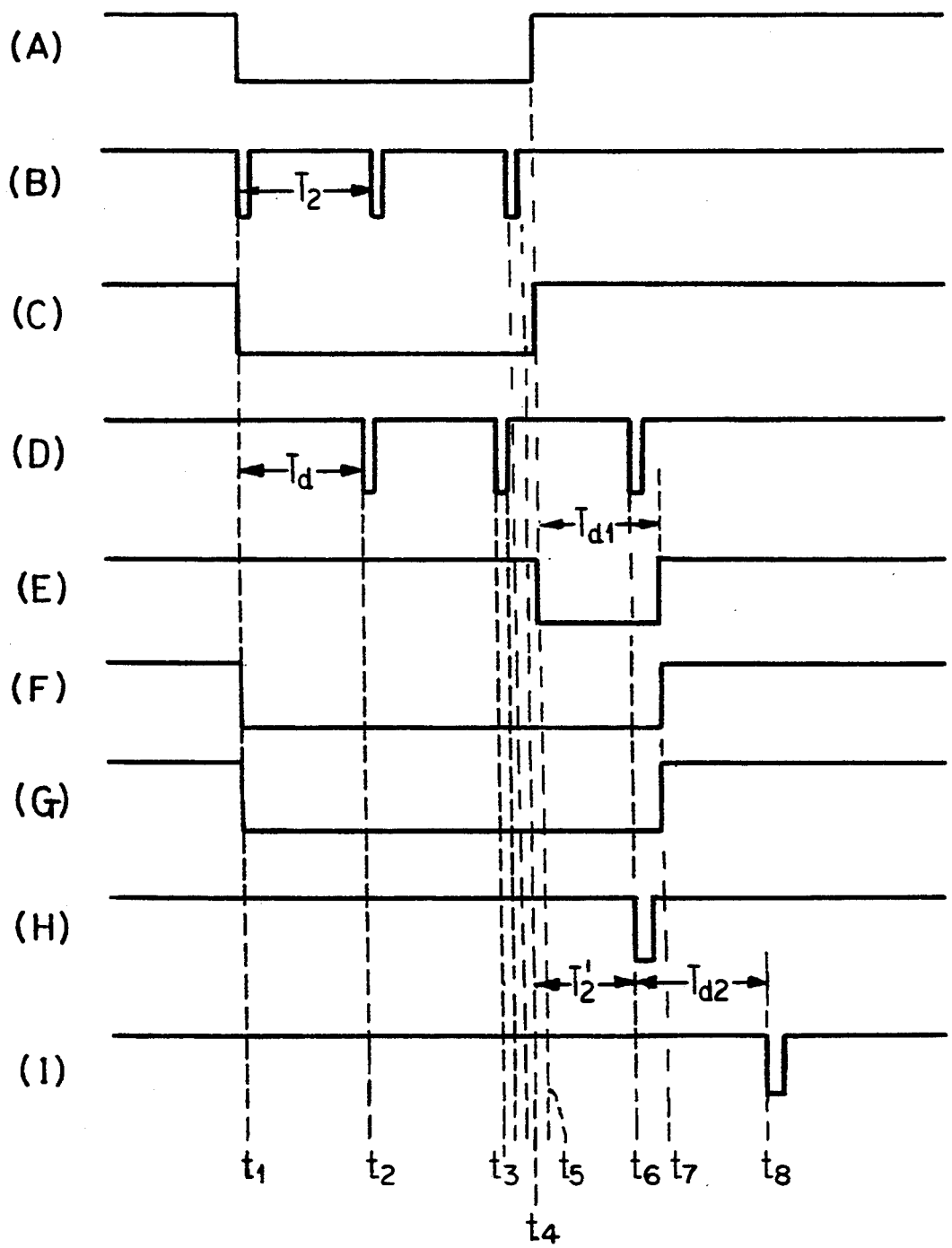
FIG. 6 is a diagram showing waveforms appearing in various parts of the FIG. 5 controller in order to explain its operation.

For a better understanding of the operation of the FIG. 5 system, reference may be had to FIG. 6 which shows the waveforms appearing in various parts of the system. The capitals A through I in FIG. 5 designates the parts where the correspondingly designated waveforms of FIG. 6 appear.

A comparison of FIG. 6 with FIG. 3 will reveal that, unlike the FIGS. 1 and 2 system, the stepping pulse generator circuit 88 generates the first of the series of stepping pulses, shown at (B) in FIG. 6, at time $t_1$ when the DRIVE SELECT signal, FIG. 6(A), becomes true.

It is understood that the DIRECTION signal generator means 90 puts out the DIRECTION signal indicative of the traveling direction of the transducer, at the same time with the series of stepping pulses. The POWER SAVE signal from its generator means 92 also goes low at the time $t_1$, as indicated at (C) in FIG. 6, to denote that the FDD is not in condition for saving power. The seek end flag is generated by the means 94 upon lapse of a preassigned period of time following the last of the series of stepping pulses, as at (h) in FIG. 6.

In short, the relative timings of the signals shown at (A), (B), (C) and (H) in FIG. 6 are conventional. FDD controllers complete with associated interfaces are commercially available which generate the signals at such timings.

According to the invention, however, the stepping pulses and DIRECTION, DRIVE SELECT and POWER SAVE signals are all not directly applied from their generator means 86, 88, 90 and 92 to the FDD 12. Nor is the seek end flag directly applied from its generator means 94 to the CPU 10.

The delay circuit 138 is intended to delay the FIG. 6(B) stepping pulses by the period Td, so that the thus amended stepping pulses, which are actually delivered to the FDD input 42, are as shown at (D) in FIG. 6. It will be seen that the first of the amended series of stepping pulse occurs at time $t_2$, or upon lapse of the delay period Td after the time $t_1$ when the DRIVE SELECT and POWER SAVE signal go low. The DIRECTION signal is similarly delayed and amended by the delay circuit 140.

The MMV 130 and AND gate 134 functions in combination to delay the moment when the FIG. 6(A) DRIVE SELECT signal goes high, from time $t_5$ to time $t_7$. Inputting the DRIVE SELECT signal from its generator means 86, the MMV 130 goes low at time $t_5$, when the DRIVE SELECT signal goes high, and remains so for a preassigned period $Td_1$ which is approximately equal to the delay period Td, as shown at (E) in FIG. 6. The AND gate 134 inputs both FIG. 6(A) DRIVE SELECT signal and FIG. 6(E) output from the MMV 130, thereby producing the amended DRIVE SELECT signal as at (F) in FIG. 6. The amended DRIVE SELECT signal goes high at the time $t_7$, shortly after the expiration of the last of the FIG. 6(D) amended series of stepping pulses.

The combination of MMV 132 and AND gate 136 similarly functions to delay the moment when the FIG. 6(C) POWER SAVE signal goes high, from time $t_5$ to time $t_7$. The thus amended POWER SAVE signal is as drawn at (G) in FIG. 6.

At (H) in FIG. 6 is shown an unamended seek end flag produced by its generator means 94 at time $t_6$, a predetermined period of time after the last of each unamended series of stepping pulses, FIG. 6(B). The delay circuit 142 imparts a time delay of $Td_2$, approximately equal to the delay period Td, to the unamended seek end flag, thereby producing an amended seek end flag at time $t_8$, as at (I) in FIG. 6, for delivery to the CPU 10.

Thus, in this alternate microcomputer system, too, each series of stepping pulses is supplied from controller 14a to FDD 12 after the clock has begun production of stable pulses upon lapse of the startup period after having been powered on. The FDD can therefore produce correct internal stepping pulses for high speed track accessing, as has been set forth with reference to FIGS. 2 and 3.

Third Form

Figure 7:
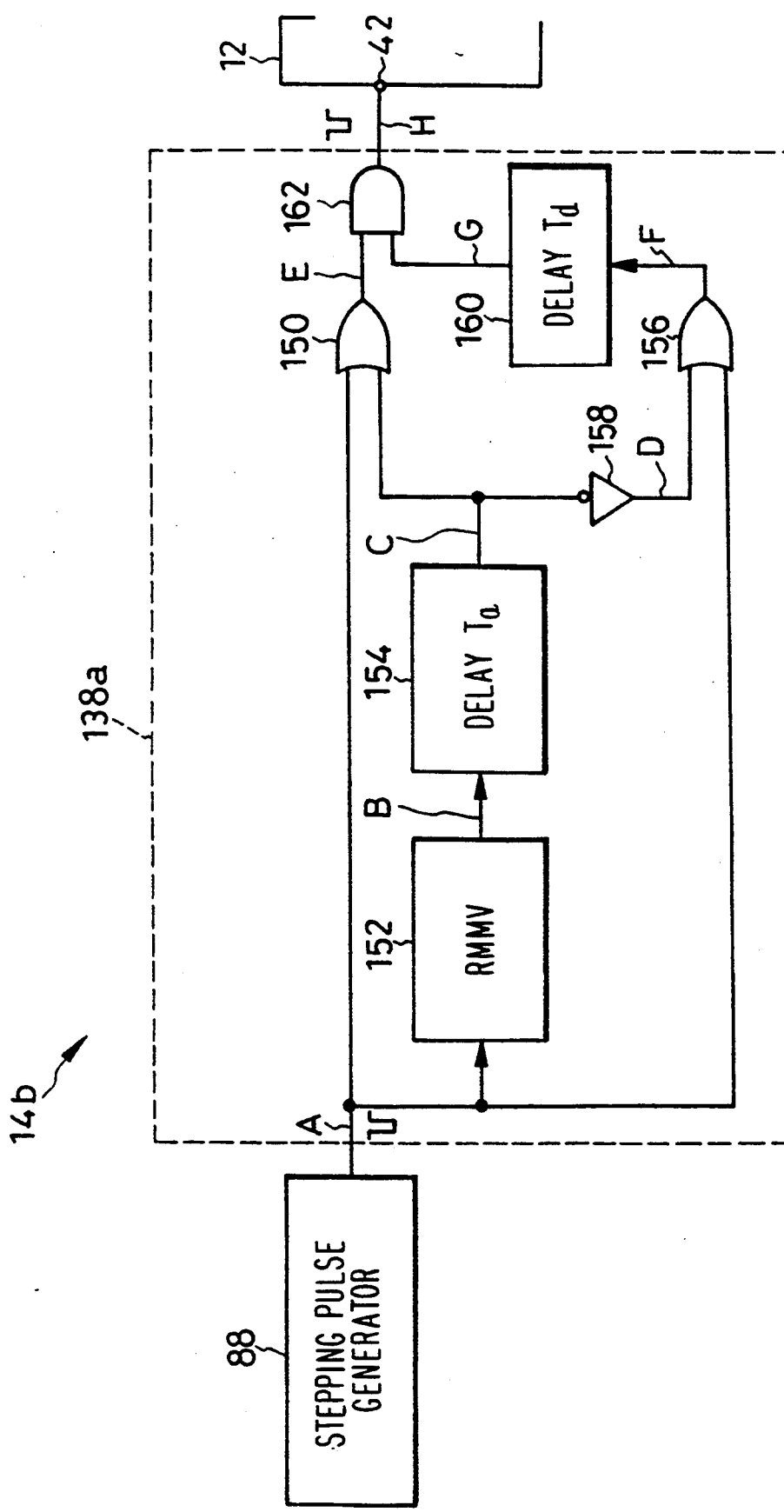
FIG. 7 is a partial block diagram of another alternate disk drive controller according to the invention.

FIG. 7 is a partial illustration of another modified FDD controller 14b for use in place of the controller 14 of the FIGS. 1 and 2 microcomputer system. The second modified FDD controller 14b is similar to the FIG. 5 controller 14a except for a delay circuit 138a connected between the stepping pulse generator means 88 and the FDD input 42 in substitution for the delay circuit 138.

The delay circuit 138a is such that the stepping pulse generator means 88 is connected directly to one input of an OR gate 150 and also to another input thereof via a serial connection of an RMMV 152 and a delay circuit 154. The delay circuit 154 is additionally connected to one input of another OR gate 156 via a NOT circuit 158, and another input of this OR gate 156 is connected to the stepping pulse generator means 88. The output of the OR gate 156 is connected via another delay circuit 160 to one input of an AND gate 162, another input of which is connected to the first mentioned OR gate 150. The output of the AND gate 162 is connected to the FDD input 42.

Operation of Third Form

Figure 8:
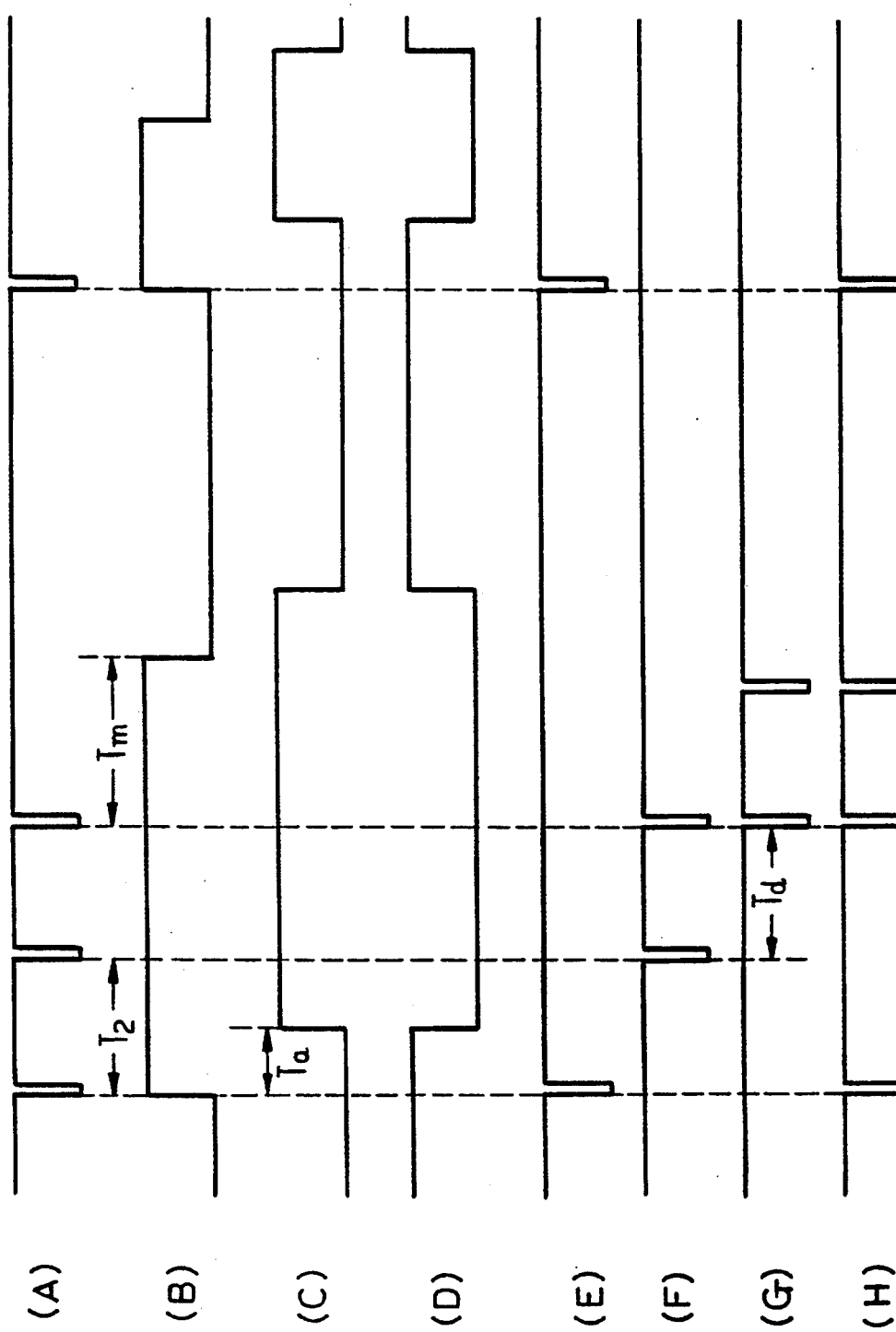
FIG. 8 is a diagram showing waveforms appearing in various parts of the FIG. 7 controller in order to explain its operation.

Reference is directed to FIG. 8 for the operational description of the FIG. 7 FDD controller 14b. The waveforms (A) through (H) of FIG. 8 appear at those parts of the FIG. 7 circuitry which are designated by like capitals.

Triggered by the first of each series of stepping pulses, shown at (A) in FIG. 8, from the generator means 88, the RMMV 152 goes high and remains so until lapse of a predetermined period Tm after the last of that series of stepping pulses, as at (B) in FIG. 8. This output from the RMMV 152 is delayed a period Ta, less than the period $T_2$ of the stepping pulses, by the delay circuit 154, so that the resulting output from the delay circuit is as depicted at (C) in FIG. 8.

The OR gate 150 inputs the FIG. 8(A) stepping pulses and the FIG. 8(C) output from the delay circuit 154. Since the delay Ta is less than the period $T_2$ of the stepping pulses, only the first of each series of stepping pulses is permitted to pass through the OR gate 150, as indicated at (E) in FIG. 8.

The output from the delay circuit 154 is also directed into the other OR gate 156 after being inverted by the NOT circuit 158 as at (D) in FIG. 8. Consequently, the OR gate 156 permits the passage therethrough of all but the first of each series of stepping pulses, as at (F) in FIG. 8. The delay circuit 160 imparts the delay period Td to the output from the OR gate 156, as at (G) in FIG. 8.

The AND gate 162 puts out the undelayed first, and the delayed subsequent ones, of each series of stepping pulses, as at (H) in FIG. 8. This output from the AND gate 162 is the amended stepping pulses, supplied to the FDD input 42, as distinguished from the unamended stepping pulses of FIG. 8(A).

Figure 9:
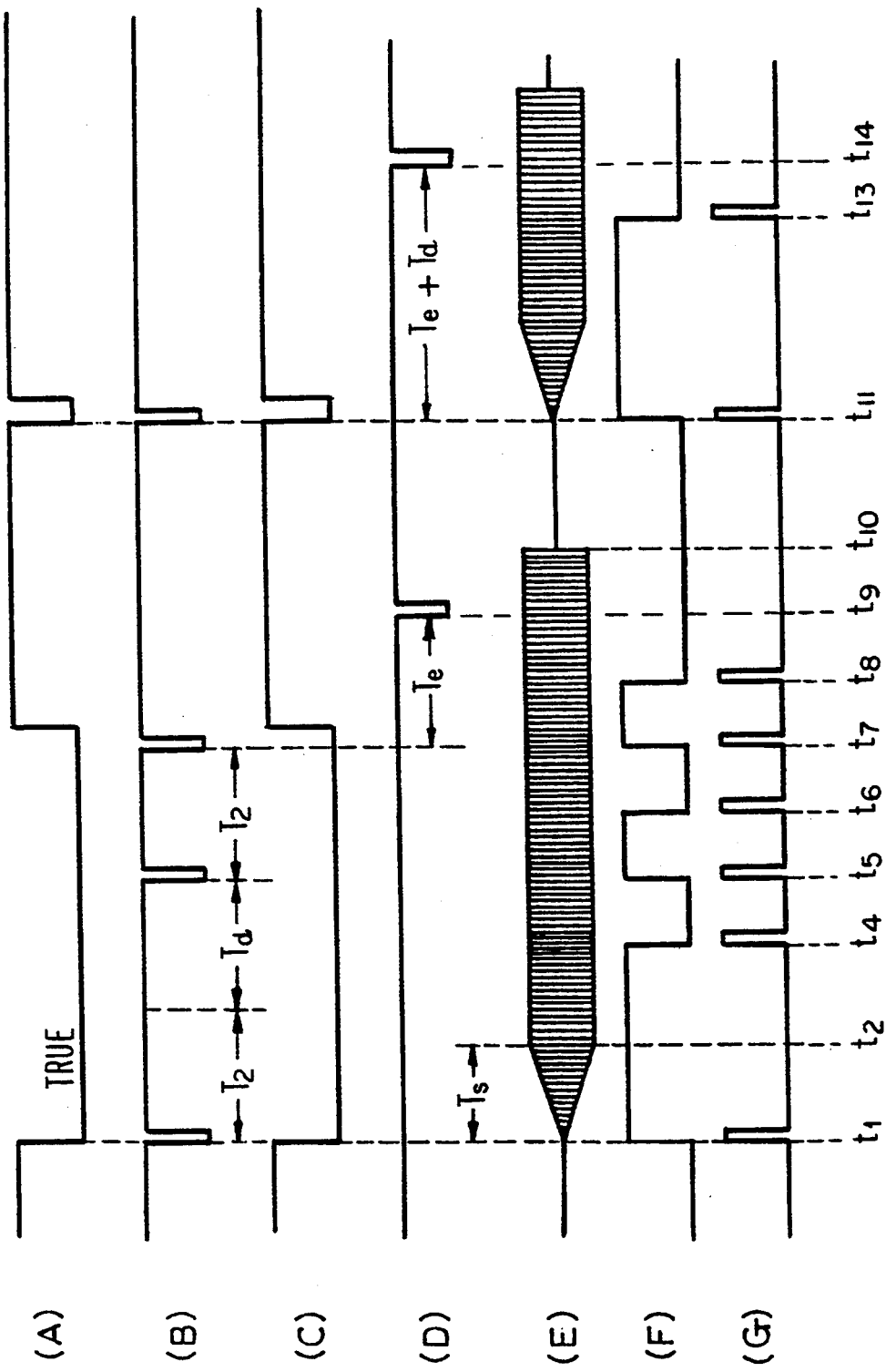
FIG. 9 is a diagram showing waveforms appearing in various parts of the FIG. 2 disk drive in order to explain the operation of the FIG. 7 controller.

The waveforms (A) through (G) in FIG. 9, appearing at correspondingly designated parts of the FIG. 2 FDD 12, are explanatory of how the amended external stepping pulses of FIG. 8(H), shown also at (B) in FIG. 9, are used in the FDD for producing internal stepping pulses that are twice as high in recurrence rate as the external ones and which are free from the influence of the unstable startup period of the clock 56.

Set by the undelayed first external stepping pulse, the counter 58 will go high at time $t_1$, as at (F) in FIG. 9, when the DRIVE SELECT signal goes low as at (A) in FIG. 9, with the consequent powering of the clock 56.

The first internal stepping pulse will thus be produced at this time $t_1$, as at (G) in FIG. 9.

However, because of the unstable clock pulses supplied from time $t_1$ to time $t_2$, the counter 58 will remain high for a longer period of time than normal and go low as at time $t_4$. The second internal stepping pulse will be produced at this time $t_4$. Being delayed, the second external stepping pulse will arrive at time $t_5$, later than the time $t_4$, resulting in the production of the third internal stepping pulse at the time $t_5$. Any subsequent internal stepping pulses will be generated as at $t_6$, $t_7$ and $t_8$ in the same way as in FIG. 3.

The seek end flag will be produced upon lapse of the period Te following the last of the series of external stepping pulses, as at (D) in FIG. 9. However, in cases where only one external stepping pulse has been input, as at time $t_{11}$, the seek end flag will be produced upon lapse of the sum of the periods Te and Td after the time $t_{11}$.

Thus, as all but the first of each series of external stepping pulses are delayed, the $t_1$–$t_4$ time internal will become so long that the second internal stepping pulse will be produced after the clock 56 has stabilized in operation and before the second external stepping pulse is input. The internal stepping pulses can therefore be infallibly produced at twice the recurrence rate of the external ones for correctly driving the stepper motor 26.

Figure 10:
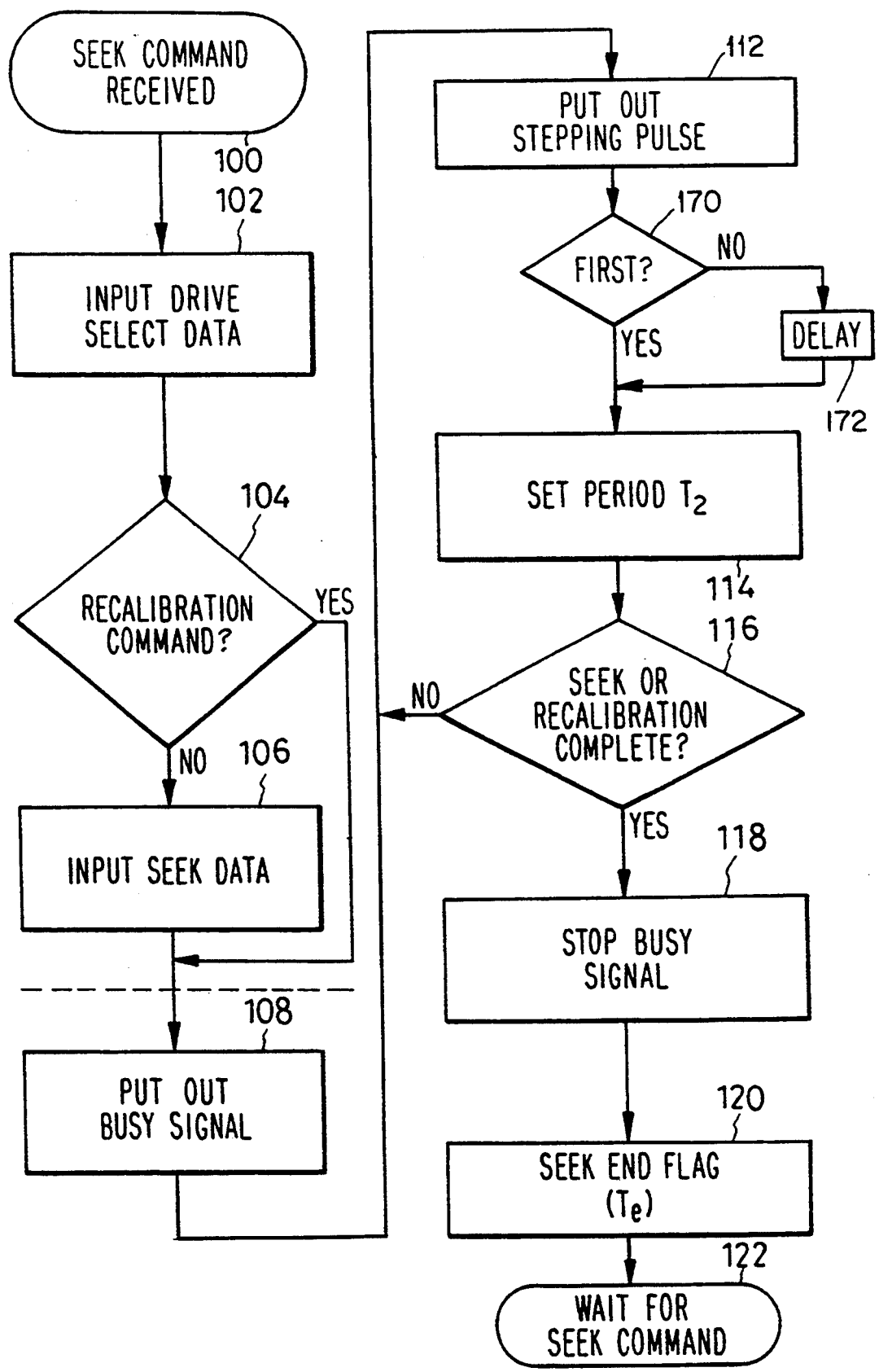
FIG. 10 is a flowchart explanatory of track seek operation according to the FIG. 7 controller.

The flowchart of FIG. 10 may be followed for implementing the scheme so far described with reference to FIGS. 7-9. The FIG. 10 flowchart is similar to that of FIG. 4 except that the former does not include the block 110 of the former but does include an additional logical node 170 and block 172 between the blocks 112 and 114. Thus, according to the FIG. 10 flowchart, each stepping pulse generated at the block 47 is determined at the node 150 as to whether it is the first of each series of such pulses. If it is, the routine proceeds to the block 114. If not, on the other hand, then the pulse is delayed by the period Td at the block 152. The other details of the FIG. 10 routine are as set forth previously with reference to FIG. 4.

Fourth Form

Figure 11:
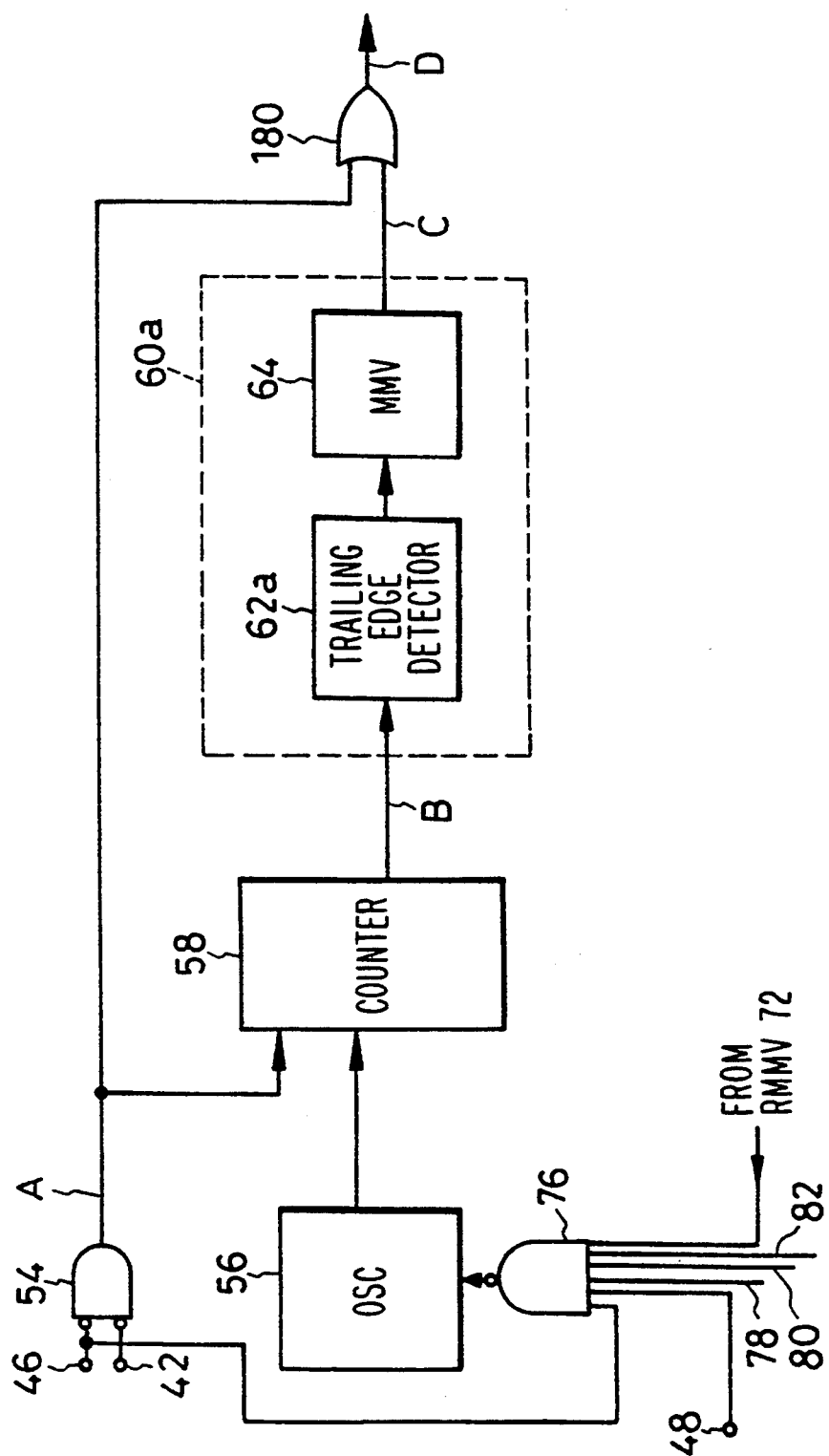
FIG. 11 is a partial block diagram of a modification of the FIG. 2 disk drive.

FIG. 11 shows a modification of the FIG. 2 FDD 12, in which modification the counter 58 is connected to one input of an OR gate 180 via a modified pulse generator circuit 60a. Another input of the OR gate 180 is connected directly to the NOR gate 54. The pulse generator circuit 60a is shown as a serial connection of a pulse trailing edge detector circuit 62a and the MMV 64. The output of the OR gate 180 is connected to the stepper motor control circuit 36, FIG. 2. This modified FDD is similar in the other details of construction to the FIG. 2 disk drive 12.

Operation of Fourth Form

Figure 12:
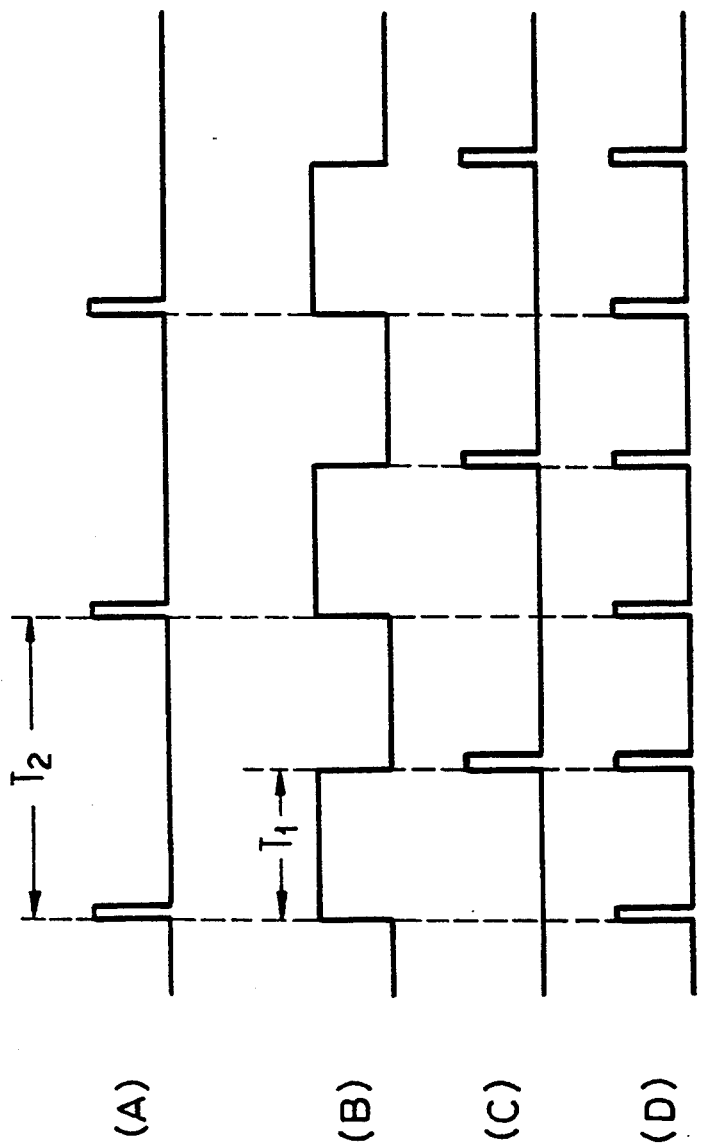
FIG. 12 is a diagram showing waveforms appearing in various parts of the FIG. 11 disk drive in order to explain its operation.

AS in the FIG. 2 disk drive 12, the NOR gate 54 provides the external stepping pulses, shown at (A) in FIG. 12, which have been delayed and which have the constant period $T_2$ as at (B) in FIG. 3. In response to each of these external stepping pulses the counter 58 puts out a pulse of the duration $T_1$, (B) in FIG. 12, equal to half the period $T_2$ of a the external stepping pulses. The trailing edge detector circuit 62a responds to these output pulses of the counter 58 by producing trigger pulses that rise sharply to indicate the trailing edges of the input pulses. The MMV 64 is triggered by these trigger pulses to produce the internal stepping pulses of FIG. 12(C) each having a duration approximately equal to that of each external stepping pulse.

Inputting both external stepping pulses from the NOR gate 54 and internal stepping pulses from the second MMV 60, the OR gate 82 interleaves them and puts out the stepping pulses of FIG. 12(D) for application to the stepper motor control circuit 36. These stepping pulses have a recurrence rate twice that of the FIG. 12(A) external stepping pulses and are free from the influence of the unstable startup period of the clock 56. The pulse generator circuit 60a may be omitted if the counter 58 is so constructed as to put out the shorter duration pulses of FIG. 12(C) upon counting the clock pulses for a length of time corresponding to the pulse duration $T_1$.

Possible Modifications

Despite the foregoing detailed disclosure, it is not desired that the invention be limited by the exact showing of the drawings or the description thereof. The following, then, is a brief list of the possible modifications, alterations and adaptations of the illustrated embodiments of this invention which are all believed to fall within the scope of the invention:

1. The clock 56 could be powered on and off only in response to the POWER SAVE signal, to the DRIVE SELECT signal, or to both, so that the term "power save signal" as used in the appended claims should be interpreted broadly, it being understood that the DRIVE SELECT signal is equivalent to the POWER SAVE signal as far as the invention is concerned.
2. The invention could be embodied in other than the illustrated microcomputer systems employing magnetic disk drives, an example being systems incorporating optical disk drives.

What is claimed is:

1. In a system having a controller and a rotating disk data transfer apparatus including a stepper motor for incrementally moving a transducer from track to track on a rotating data storage disk, the apparatus also including a clock for generating clock pulses, the clock being unstable in operation during a predefinable startup period thereof after being powered on, a method of generating stepping pulses internally of the data transfer apparatus in response to external stepping pulses from the controller for driving the stepper motor, which method comprises:
   (a) supplying a power save signal from the controller to the data transfer apparatus, the power save signal having a first prescribed state indicative of the fact that the apparatus is in condition for saving power, and a second prescribed state indicative of the fact that the apparatus is not in condition for saving power;
   (b) supplying external stepping pulses, either singly or in a series of two or more, from the controller to the data transfer apparatus after imparting a predetermined delay, longer than the startup period of the clock, to at least all but the first of each series of external stepping pulses with respect to a moment of change of the power save signal from the first to the second prescribed state, the predetermined delay being applied to each single external stepping pulse only in the case where all of each series of external stepping pulses are delayed, each series of external stepping pulses having a constant period except for the predetermined delay;
   (c) counting, in the data transfer apparatus, the clock pulses for a preassigned length of time, shorter than the period of each series of external stepping pulses, in response to each incoming external stepping pulse in order to provide counter output pulses that rise with the respective external stepping pulses; and
   (d) generating internal stepping pulses in synchronism with at least trailing edges of the counter output pulses for driving the stepper motor;
   (e) whereby the internal stepping pulses can be generated in response to the external stepping pulses without being affected by the unstable clock pulses during the startup period of the clock, so that the clock can be held unpowered when the power save signal is in the first prescribed state.

2. The method of claim 1 wherein the preassigned length of time during which the clock pulses are counted in response to each incoming external stepping pulse is equal to half the period of each series of external stepping pulses, so that each counter output pulse has a duration equal to half the period of each series of external stepping pulses.

3. The method of claim 2 wherein the internal stepping pulses are generated in synchronism with both leading and trailing edges of the counter output pulses.

4. The method of claim 2 wherein the internal stepping pulses are generated in synchronism with only the trailing edges of the counter output pulses, and wherein the internal stepping pulses are interleaved with the external stepping pulses for driving the stepper motor.

5. A controller for a rotating disk data storage apparatus of the type having a stepper motor for incrementally moving a transducer from track to track on a rotating data storage disk, a clock for generating clock pulses, the clock being unstable in operation during a predefinable startup period thereof after being powered on, first input means for inputting a power save signal having a first prescribed state indicative of the fact that the apparatus is in condition for saving power, and a second prescribed state indicative of the fact that the apparatus is not in condition for saving power, second input means for inputting external stepping pulses, either singly or in a series of two or more having a predetermined period, a counter connected to both the clock and the second input means for counting the clock pulses for a preassigned length of time, shorter than the period of each series of external stepping pulses, in response to each external stepping pulse and hence for providing output pulses that rise with the respective external stepping pulses, and a pulse generator circuit connected to the counter for generating internal stepping pulses in synchronism with at least trailing edges of the output pulses of the counter, the internal stepping pulses being used for driving the stepper motor, the controller comprising:
   (a) first generator means for supplying the power save signal to the first input means of the data transfer apparatus;
   (b) second generator means for supplying to the second input means of the data transfer apparatus the external stepping pulses after imparting a predetermined delay, longer than the startup period of the clock, to at least all but the first of each series of external stepping pulses with respect to a moment of change of the power save signal from the first to the second prescribed state, the predetermined delay is being applied to each single external stepping pulse only in the case where the predetermined delay is applied to all of each series of external stepping pulses;

(c) whereby the internal stepping pulses can be generated in response to the external stepping pulses without being affected by the unstable clock pulses during the startup period of the clock, so that the clock can have a power control input thereof connected to the first input means of the data transfer apparatus in order to be held unpowered when the power save signal is in the first prescribed state.

6. The controller of claim 5 wherein the predetermined delay is imparted to all of each series of external stepping pulses and to each single external stepping pulse, and wherein the controller further comprises third generator means for generating a seek end flag upon lapse of a second preassigned length of time after the last of each series of external stepping pulses and after each single external stepping pulse.

7. The controller of claim 5 wherein the predetermined delay is imparted only to all but the first of each series of external stepping pulses, and wherein the controller further comprises third generator means for generating a seek end flag upon lapse of a second preassigned length of time after the last of each series of external stepping pulse and upon lapse of the sum of the predetermined delay and the second preassigned length of time after each single external stepping pulse.

8. The controller of claim 5 wherein the first generator means comprises:

(a) means for generating the power save signal such that each second prescribed state thereof has a duration dependent upon each single external stepping pulse or each series of external stepping pulses; and (b) means connected to the generating means for delaying the moment the power save signal changes from the second to the first prescribed state, by a length of time approximately equal to the predetermined delay.

9. The controller of claim 5 wherein the second generator means comprises:

(a) means for generating each single external stepping pulse or each series of external stepping pulses at the same time when the power save signal changes from the first to the second prescribed state; and (b) means connected to the generating means for imparting the predetermined delay to each external stepping pulse generated by the generating means.

10. The controller of claim 5 wherein the second generator means comprises:

(a) means for generating each single external stepping pulse or each series of external stepping pulses at the same time when the power save signal changes from the first to the second prescribed state; and (b) means connected to the generating means for imparting the predetermined delay only to all but the first of each series of external stepping pulses.

11. In a system having a controller and a rotating disk data storage apparatus, wherein the apparatus includes a stepper motor for incrementally moving a transducer from track to track on a rotating data a storage disk, a system for generating stepping pulses internally of the apparatus in response to external stepping pulses from the controller for driving the stepper motor, comprising:

(a) first generator means in the controller for generating a power save signal having a first prescribed state indicative of the fact that the data transfer apparatus is in condition for saving power, and a second prescribed state indicative of the fact that the apparatus is not in condition for saving power;

(b) second generator means in the controller for generating external stepping pulses, either singly or in a series of two or more having a predetermined period, after imparting a predetermined delay, to at least all but the first of each series of external stepping pulses with respect to a moment of change of the power save signal from the first to the second prescribed state, the predetermined delay being applied to each single external stepping pulse only in the case where the predetermined delay is applied to all of each series of external stepping pulses;

(c) first input means in the apparatus for inputting the power save signal;

(d) second input means in the apparatus for inputting the external stepping pulses;

(e) a clock in the apparatus for generating clock pulses, the clock being unstable in operation during a predefinable startup period thereof after being powered on, the predetermined delay being longer than the startup period of the clock;

(f) a counter in the apparatus connected to both the second input means and the clock for counting the clock pulses for a preassigned length of time, shorter than the period of each series of external stepping pulses, in response to each incoming external stepping pulse and hence for providing output pulses that rise with the respective external stepping pulses; and (g) a pulse generator circuit connected to the counter for generating internal stepping pulses in synchronism with at least trailing edges of the output pulses of the counter;

(h) whereby the internal stepping pulses can be generated in response to the external stepping pulses without being affected by the unstable clock pulses during the startup period of the clock, so that the clock can have a power control input thereof connected to the first input means of the data transfer apparatus in order to be held unpowered when the power save signal is in the first prescribed state.

12. The system of claim 11 wherein the preassigned length of time during which the counter counts the clock pulses in response to each incoming external stepping pulse is equal to half the period of each series of external stepping pulses, so that each output pulse of the counter has a duration equal to half the period of each series of external stepping pulses, and wherein the pulse generator circuit comprises:

(a) a pulse edge detector circuit connected to the counter for producing trigger pulses in synchronism with both leading and trailing edges of the output pulses of the counter; and (b) a monostable multivibrator connected to the pulse edge detector circuit for producing the internal stepping pulses on being triggered by the trigger pulses, so that the internal trigger pulses are twice as high in recurrence rate as the external stepping pulses.

13. The system of claim 11 wherein the preassigned length of time during which the counter counts the clock pulses in response to each incoming external stepping pulse is equal to half the period of each series of external stepping pulses, so that each output pulse of the counter has a duration equal to half the period of each series of external stepping pulses, and wherein the pulse generator circuit comprises:
  (a) a pulse edge detector circuit connected to the counter for producing trigger pulses in synchronism with trailing edges of as the output pulses of the counter; and
  (b) a monostable multivibrator connected to the pulse edge detector circuit for producing the internal stepping pulses on being triggered by the trigger pulses.

14. The system of claim 13 wherein the data transfer apparatus further comprises means connected to both the second input means and the monostable multivibrator for interleaving the external and the internal stepping pulses.

* * * * *